United States Patent [19]

Gautney

[11] Patent Number: 4,676,822

[45] Date of Patent: Jun. 30, 1987

[54] FLUID FERTILIZERS CONTAINING THIOPHOSPHORYL TRIAMIDE

[75] Inventor: Joe Gautney, Sheffield, Ala.

[73] Assignee: Tennessee Valley Authority, Muscle Shoals, Ala.

[21] Appl. No.: 889,011

[22] Filed: Jul. 24, 1986

[51] Int. Cl.$^4$ ............................................... C05G 3/08
[52] U.S. Cl. ........................................ 71/29; 71/902
[58] Field of Search ................... 71/1, 11, 27, 29, 902, 71/DIG. 1, 65

[56] References Cited

U.S. PATENT DOCUMENTS

H25    2/1886  Radel ............................... 71/902 X
4,518,413  5/1985  Swerdloff et al. ................ 71/902 X Primary Examiner—Ferris H. Lander
Attorney, Agent, or Firm—Robert A. Petrusek

[57] ABSTRACT

The herein described practice and operating procedures relating to the instant invention have demonstrated the utility and economic advantages of slightly acidic, neutral, and slightly basic fluid fertilizer solutions containing urea and the urease inhibitor thiophosphoryl triamide in preventing or at least substantially reducing the loss of ammoniacal nitrogen from soils to which such fluid fertilizers are often surface applied. The results of said testing procedures also demonstrate a new, novel, and heretofore unknown method of utilizing said thiophosphoryl triamide in conjunction with urea which method circumvents the problem usually encountered in the practice of prior art processes of rapid inhibitor decomposition in solid mixtures with urea.

6 Claims, 4 Drawing Figures

UREASE INHIBITION OF TPTA AND PPDA IN
A BANDED SOIL SYSTEM AT 25°C

UREASE INHIBITION OF TPTA AND PPDA IN A BANDED SOIL SYSTEM AT 25°C

STABILITY OF TPTA IN 40 WT. %
UREA SOLUTION AT 25°C

STABILITY OF TPTA IN UAN (31-0-0) AND UAN (36-0-0) AT 25°C

FLUID FERTILIZERS CONTAINING THIOPHOSPHORYL TRIAMIDE

The invention herein described may be manufactured and used by or for the Government for governmental purposes without the payment to me of any royalty therefor.

INTRODUCTION

The enzyme urease (urea amidohydrolase, EC 3.5.1.5) is an ubiquitous component of many soil systems and has been isolated from a number of microbes and many different plants. In soil systems, urease activities serve to catalyze the hydrolysis of urea to produce ammonia and carbon dioxide according to the following reaction:

$$NH_2CONH_2 + H_2O \xrightarrow{urease} 2NH_3 + CO_2$$

The ammonia produced is subsequently hydrolyzed to nutrient ammonium salts.

$$NH_3 + H_2O \rightleftharpoons NH_4^+ + OH^-$$

The $NH_4^+$ then is transformed to $NO_3^-$ by aerobic nitrifying bacteria in the soil.

$$NH_4^+ + 2O_2 \rightarrow NO_3^- + H_2O + 2H^+$$

The sequence of reactions supra serves a vital function in providing inorganic nitrogen for growing plants. However, urease-induced hydrolysis of urea can cause a considerable loss of volatile ammonia, especially when urea fertilizers are surface applied to agricultural soils [Darrell W. Nelson, "Nitrogen in Agricultural Soils," Am. Soc. Agron., Madison, WI., pp 327-358 (1982)]. As reported, most of the ammonia volatilization from urea occurs in the first week after application. It has long been appreciated by those skilled in the art that even moderate delays in urea hydrolysis during this initial time period after such surface application can greatly reduce ammonia volatilization losses for several reasons. For instance, the farmer has more time to incorporate urea beneath the soil surface before such ammonia losses occur. In addition, there is a greater probability of receiving rain during such an extended period with the resulting incipient percolation of the fertilizer nitrogen values of said urea into the soil before such ammonia losses occur. Also, a larger fraction of the applied nitrogen is converted to $NO_3$—before being lost as ammonia.

BACKGROUND OF THE INVENTION

Urea and urea-containing fertilizers presently account for at least about 30 percent of the fertilizer nitrogen applied in the United States [J. Darwin Bridges, Fertilizer Trends 1982, TVA (1983)], and urea accounts for as much as 60 percent of the fertilizer nitrogen applied worldwide (unpublished TVA data). The economics-based prediction for these percentages shows an increase because urea has a high nitrogen content, low transportation cost, and low production cost relative to alternative nitrogen sources, such as ammonium nitrite and ammonium sulfate. Inasmuch as the relative importance of urea as a primary nitrogen fertilizer is expected to increase to even greater proportions than it now enjoys and substantial amounts of such urea and/or urea-containing fertilizers are applied in situations such as reduced tillage, pastures, and nonmechanized agriculture where it is impractical to mechanically incorporate urea to prevent ammonia volatilization, it will be readily appreciated that the development and practice of using suitable urease inhibitors is an endeavor of considerable importance for both domestic and international agricultural considerations.

1. Field of the Invention

The concept underlying the gist of the instant invention is based on the unexpected discovery that thiophosphoryl triamide is more stable in slightly acidic, neutral, and slightly basic fluid fertilizers than it has been found to be in solid mixtures with urea.

2. Description of Prior Art

A number of chemical compounds have been patented or demonstrated effective as urease inhibitors. Perhaps the best-known urease inhibitor is phenyl phosphorodiamidate (PPDA), $(C_6H_5O)PO(NH_2)_2$. Several researchers in the prior art have demonstrated that PPDA is an extremely potent inhibitor of urease activity [P. Held, S. Lange, E. Tradler, M. Klepel, D. Drohne, H. J. Hartbrich, G. Rothe, H. Scheler, S. Grundmeier, and A. Trautman, East German Pat. No. 122,177 (Cl. CO5G3/08, Sept. 20, 1976), Chem. Abstracts 87:67315W, D. A. Martens and J. M. Bremner, Soil Sci. Soc. Am. J. 48, 302-305 (1984)]. Because of its effectiveness PPDA has become the standard by which all other urease inhibitors normally are judged. Another phosphoramide, phosphoryl triamide (PTA), $(NH_2)_3PO$ and a series of N-(diaminophosphinyl)aryl-carboxamides were patened as urease inhibitors by Bayless and Millner [U.S. Pat. Nos. 4,242,325 (1980) and 4,182,881 (1980)]. Other researchers have shown that diamidophosphoric acid (DAPA), $(NH_2)_2PO(OH)$, and monoamido phosphoric acid, MAPA, $NH_2PO(OH)_2$, are urease inhibitors [A. Barth, W. Rollka, and H. J. Michel; Wissenschaftliche Beitraege-Martin Luther Universitaet Halle Wittenberg, No. 2, pp 5-10 (1980); N. E. Dixon, C. Gazzola, J. J. Waters, R. L. Blakeley, and B. Zerner, J. Am. Chem. Soc. 97, 4131 (1975)]. More recently, a new compound, thiophosphoryl triamide (TPTA), $(NH_2)_3PS$ has been demonstrated to be an urease inhibitor (R. J. Radel, U.S. Statutory Invention Registration No. H25, Feb. 4, 1986). Thiophosphoryl triamide has been shown by Radel supra to be comparable and in some cases more effective than PPDA in its urease inhibition effect.

In this area of the prior art relating to certain compounds and materials for purposes of urease inhibitor use, it has been shown to be highly desirable that the inhibitor material be intimately mixed with the fertilizer material with which it is to used. This procedure ensures the positional proximity to the fertilizer to inhibit urease activity. Therefore, in order for a urease inhibitor to be of practical use, it must be compatible with the fertilizer materials with which it is to be used. For example, if the inhibitor decomposes in the process of incorporation into fertilizer materials or decomposes in the fertilizer materials during storage prior to application to soil, then it is ineffective unless its degradation products are also effective inhibitors.

Solid urea for fertilizer use is normally produced by either the processes of prilling or of granulation. In order to use urease inhibitors in solid urea produced by such processes it has been found not only desirable, but indeed necessary to incorporate the inhibitor into the urea at the point of manufacture during either the prilling or the granulation process, it being understood that homogeneity of the end product is of the utmost importance. This consideration, of course, requires that the inhibitor be exposed to hot urea melts (140° C.) for at least short periods of time (generally less than about five minutes). After cooling, the resulting solid urea urease inhibitor enriched granules are stored in huge piles in bulk storage sheds for periods of time which frequently range as long as from six months to one year.

The prior art teaches that urea-containing fluids can also be used as fertilizer. Such fluids usually comprise water, urea, clay (as a suspending agent), and other fertilizer materials such as ammonium nitrate. The most commonly used high nitrogen fluids containing urea are urea-ammonium nitrate (UAN) solution and suspension of grades 28-0-0 and 31-0-0. At the present time the Tennessee Valley Authority is developing two new high-analysis fluids containing urea, which fluids are in the form of suspensions. These fluids are an UAN suspension of grade 36-0-0 and an urea-ammonium sulfate suspension (UAS) of grade 29-0-0-5S. Fluid fertilizers have several advantages over solid fertilizers. Fluids allow more uniform application of fertilizer materials than solid forms, they are easy to transport and handle, and because they can be applied uniformly they are excellent carriers for micronutrients and pesticides.

In the practice of fluid fertilizer use, nitrogen base fluids such as UAN (28-0-0), UAN (31-0-0), UAN (36-0-0), and UAS (29-0-0-5S), and phosphorous base fluids such as 10-34-0, 9-32-0, 13-38-0, and 10-30-0 are usually produced at the fertilizer manufacturing site and are subsequently shipped to fertilizer dealers who in turn apply the fluids directly or custom mix them to suit the needs of individual farmers. Custom mixtures are usually applied within one week after preparation. Accordingly, it will be appreciated that this practice of fluid fertilizer use thus provides for but two options for addition of urease inhibitors to fluid fertilizers, i.e., addition at the manufacturing site, or addition by the fertilizer dealer just prior to the application thereof.

Studies of the feasibility of cogranulating PPDA with urea [J. Gautney, Y. K. Kim, and P. M. Gagen, *I&EC Prod. R&D* 23, 483–489, (1984)] showed that this inhibitor could be cogranulated with urea with only small losses of inhibitor during the granulation process. Later studies [J. Gautney, A. R. Barnard, D. B. Penney, and Y. K. Kim, "Solid-State Decomposition Kinetics of Phenyl Phosphorodiamidate," *Soil Science Society of America Journal* 50, 792–797, (1986)] showed that PPDA decomposes in the solid state and that the rate of PPDA decomposition is accelerated in urea mixtures. For example, at 25° C. the half-life of PPDA is 254 years, whereas in mixtures with urea the half-life is only 0.9 years.

The results of decomposition kinetic studies with PPDA in fluid fertilizers indicate that this inhibitor also decomposes quite rapidly in fluid fertilizers [J. Gautney, Y. K. Kim, and A. R. Barnard, "Solubilities and Stabilities of the Nitrogen Loss Inhibitors Dicyandiamide, Thiourea, and Phenyl Phosphorodiamidate in Fluid Fertilizers," *I&EC Prod. R&D* 24, 155–161, (1985)]. Phenyl phosphorodiamidate decomposition rates were much faster in fluids than in solid mixtures with urea. In UAN (31-0-0) at 25° C. the first-order reaction half-life ranged from 1.2 days at pH 8.14 to 6.1 days at pH 6.46. Decomposition rate constants for PPDA in UAN (36-0-0) and UAS (29-0-0-5S) saturated with PPDA at 25° C. were 10.2 and 20.5 percent decomposition per day, respectively.

As a result of its instability, the use of PPDA in solid urea is generally considered impractical and its use in fluid fertilizers is severely limited inasmuch as delays of as little as one to two days (commonly encountered because of inclement weather) between addition of PPDA to the fluid fertilizer and application to the soil can result in significant inhibitor losses.

Fertilizer compatibility studies with PTA and TPTA (TVA Bulletin Y-191, "New Developments in Fertilizer Technology," October 1985) showed that PTA is much less stable in urea melt than PPDA and as a result probably cannot be cogranulated with urea without significant losses of inhibitor. Thiophosphoryl triamide, on the other hand, was found to be substantially more stable in urea melt than PPDA and a result can be cogranulated with urea with minimal inhibitor loss.

Compatibility studies with PTA and TPTA in solid mixtures with urea (J. Gautney, Y. K. Kim, R. J. Miles, and L. M. Mossburg, unpublished TVA data, 1985) gave reaction half-lives of 4.3 and 38.5 hours, respectively, at 25° C. and a water partial pressure of 12.73 mm of Hg. As a result of the instability of PTA and TPTA, the use of these inhibitors in solid mixtures with urea, like that of PPDA, has to be considered impractical.

More recently, it has been quite unexpectedly discovered that TPTA is more stable in slightly acidic, neutral, and slightly basic fluid fertilizers containing urea than it is in solid mixtures with urea. This discovery forms the basis for the principal objects, findings, and teachings of the present invention.

SUMMARY OF THE INVENTION

The present invention relates to the use of the urease inhibitor thiophosphoryl triamide (Robert J. Radel, U.S. Statutory Invention Registration (SIR) No. H25, Feb. 4, 1986) in slightly acidic, neutral, and slightly basic fluid fertilizers containing urea. Said thiophosphoryl triamide (I) and its linear thermal polymers (II) have the structures illustrated below and are taught by Radel to be highly effective inhibitors of urease activity in agricultural soil systems.

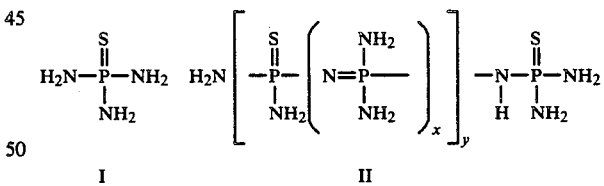

I          II

For purposes of teaching, disclosing, and claiming the instant invention, the teachings, disclosures, and claims of said SIR, H25, Feb. 4, 1986, supra, are herewith and hereby incorporated herein by reference thereto. Said present invention is based on the unexpected discovery that TPTA is more stable in slightly acidic, neutral, and slightly basic fluid fertilizers containing urea than it is in solid mixtures with urea. In the practice of the instant invention it has been demonstrated that the use of TPTA in slightly basic fluid fertilizers containing urea decreases the rate of urea hydrolysis by the enzyme urease. In addition, there are strong indications that a like decrease in the rate of hydrolysis is evidenced in neutral and slightly acidic fluid fertilizer. In the herein teachings of the instant invention there also is demonstrated a method for using TPTA with urea which all-together avoids or at least substantially alleviates the problems of rapid inhibitor decomposition which occur if TPTA and urea are combined in the solid state.

OBJECTS OF THE INVENTION

It is therefore a principal object of the present invention to provide slightly acidic, neutral, or slightly basic fluid fertilizers containing urea and the urease inhibitor thiophosphoryl triamide, said fertilizers having improved efficiency because of the urease inhibition effect of TPTA which prevents or greatly reduces the loss of ammoniacal nitrogen from soils to which said fertilizers are applied.

Another object of the present invention is to provide slightly acidic, neutral, or slightly basic fluid fertilizers containing urea and the urease inhibitor thiophosphoryl triamide, said fertilizers having improved efficiency because of the urease inhibition effect of TPTA which prevents or greatly reduces the loss of ammoniacal nitrogen from soils to which said fertilizers are surface applied.

A further and related object of the present invention is to provide a method for using TPTA with urea which circumvents the problem of rapid inhibitor decomposition in the solid state and allows the practical utilization of TPTA to retard urea hydrolysis in soils.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWINGS

The present invention, together with further objects and advantages thereof, will be better understood from a consideration of the following descriptions taken in connection with the accompanying drawings in which.

Figure 1:
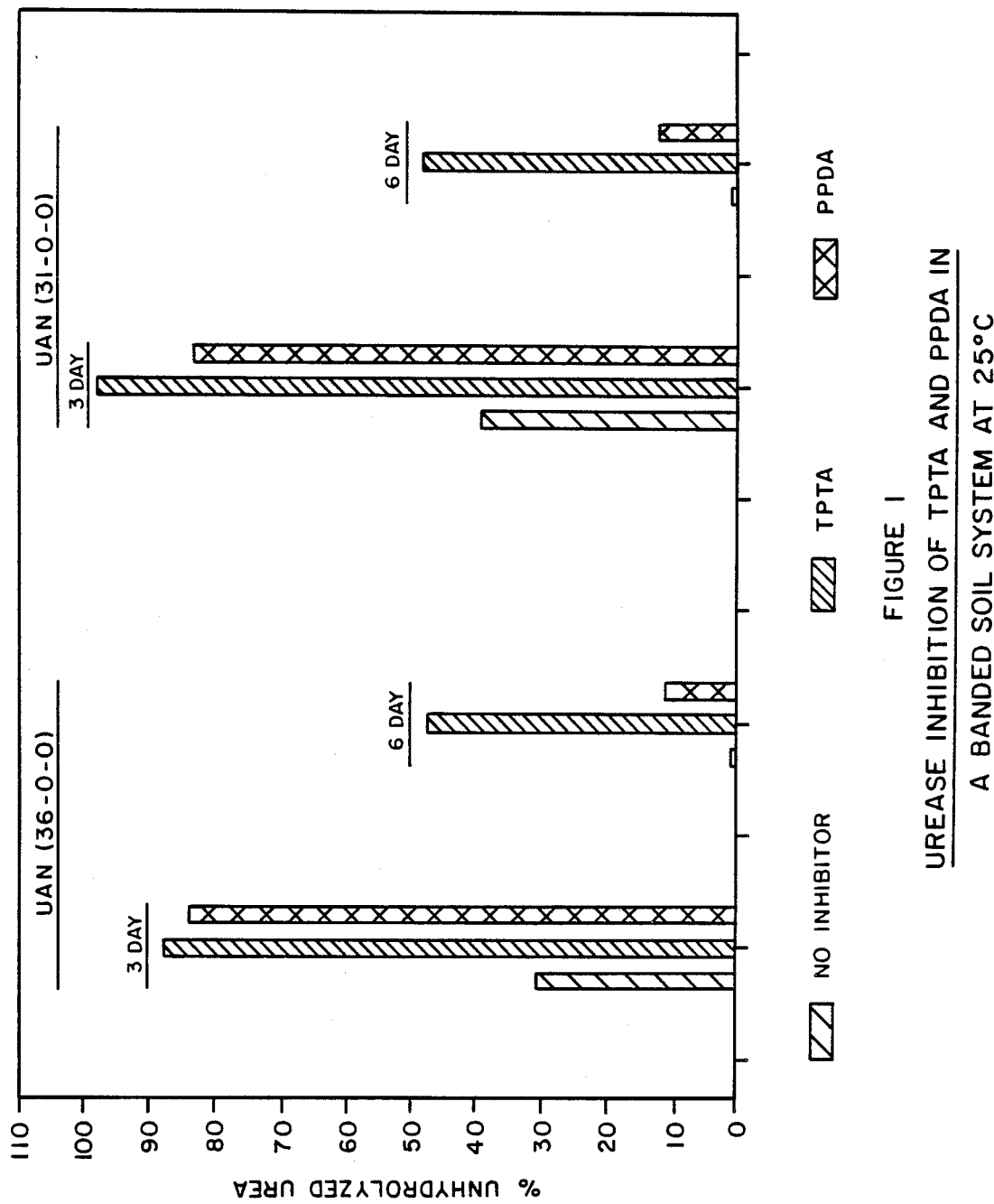
FIG. 1 is a graphical representation of the urease inhibition effect of TPTA in fluid fertilizers UAN (36-0-0) and UAN (31-0-0) showing the percent unhydrolyzed urea after three and six days' incubation at 25° C. in a banded soil system. Results with PPDA and without inhibitor are also given for comparison. See Example I, infra.

For the sake of convenience and greater appreciation of the results of the discoveries leading to the present invention, as noted supra, more specific references to FIGS. 1–4 are combined with the appropriate discussion of pertinent data and presented therewith in Examples I to V, infra.

DESCRIPTION OF PREFERRED EMBODIMENTS

For ease and convenience of application, the TPTA may be incorporated into slightly acidic, neutral, or slightly basic fluid fertilizers containing urea by dissolving or suspending solid TPTA in said fluid fertilizers. The dissolution and suspending process may be aided by mechanical mixing, addition of suspending agents, or other means knowledgeable to those skilled in this art and generally acquainted with various methods and means for producing and/or blending fluid fertilizers.

EXAMPLES

In order that those skilled in the art may better understand how the various embodiments of the present invention may be utilized and incorporated into various means and methods for the practice thereof, the following examples are given by way of illustration and not necessarily by way of limitation. The chemical compositions of the fluid fertilizers used in the examples are shown in Table I infra.

TABLE I

Chemical Composition of UAN (31-0-0) and UAN (36-0-0)

| Fluid | Total N | Urea-N | $NH_4$—N | $NO_3$—N | Clay | pH |
|---|---|---|---|---|---|---|
| 31-0-0 | 31.86 | 17.4 | 7.42 | 7.04 | 2 | 8.1 |
| 36-0-0 | 36.98 | 27.4 | 4.94 | 4.64 | 1.5 | 7.4 |

Wt %

EXAMPLE I

The results of the tests comprising this example are offered in an effort to demonstrate the viability of the teachings of the instant invention as it relates to the use of slightly acidic, neutral, and slightly basic fluid fertilizer compositions containing thiophosphoryl triamide for controlling urea hydrolysis in soils.

Samples of UAN (31-0-0), 1 g, and (36-0-0), 0.66 g containing approximately 0.38 g urea and 0.041 g of TPTA were prepared by dissolving solid TPTA in 31-0-0 and 36-0-0 of the compositions shown in Table I, supra. Identical samples containing PPDA and without either inhibitor were prepared to serve as references for purposes of data comparison.

Urease-active soil (Hastings silt loam) was moistened to a moisture content of 20 percent and preincubated at room temperature for two days. Plexiglass containers (6×6×6 cm) were one-half filled with soil and packed to a bulk density of 1.0 g/cm³. The 31-0-0 and 36-0-0 samples containing TPTA and PPDA as well as samples containing no inhibitor were distributed evenly in a narrow band 6 cm along the soil surface. The containers were filled with soil and again packed to a bulk density of 1.0 g/cm³. The containers were incubated at 25° C. for the desired reaction period. After incubation the soil from each container was thoroughly mixed, and a 10-g sample was extracted with 100 mL of 2M KCl containing 5 ppm phenylmercuric acetate to prevent urea hydrolysis during handling [L. A. Douglass and J. M. Bremner, Soil Sci. Soc. Am. Proc. 34, 859–862 (1970)]. The urea in the extracts was determined colorimetrically as a measure of unhydrolyzed urea. The results of three-day and six-day incubation tests are illustrated in Table II infra; and as noted supra, plotted in FIG. 1.

The data in Table II and FIG. 1 clearly shows the effectiveness of TPTA as a urease inhibitor in fluid fertilizers 31-0-0 and 36-0-0. In 36-0-0 with TPTA, 88 and 48 percent of the urea remained unhydrolyzed after three and six days' incubation, respectively. This compares to 31 and 0.6 percent, respectively, for 36-0-0 without inhibitor; and 84 and 11 percent, respectively, for 36-0-0 with PPDA. Similar results were obtained in 31-0-0. Thus, TPTA is not only a very effective inhibitor but is also clearly superior to PPDA, especially at the longer incubation time. The amount of unhydrolyzed urea in the soil with TPTA after six days being approximately four times that of the PPDA treatment.

TABLE III

Stability of TPTA in Solid Mixtures With Urea
[90% Urea-10% TPTA, P(H$_2$O) = 12.73 mm Hg]

| (Heating time) | % of original TPTA remaining | | |
|---|---|---|---|
| (hr) | 42° C. | 50° C. | 60° C. |
| 0.00 | 100.00 | 100.00 | 100.00 |
| 1.00 | — | — | 94.07 |
| 1.01 | — | 97.17 | — |
| 2.00 | 94.78 | 93.80 | 71.98 |
| 3.00 | — | 85.92 | 32.26 |
| 4.00 | 83.48 | 71.31 | 3.46 |
| 5.00 | 79.80 | 53.40 | 0.00 |
| 6.00 | — | 34.26 | 0.00 |
| 7.00 | 60.03 | 23.40 | |
| 8.00 | — | 10.56 | |
| 9.0 | 53.44 | | |
| 9.75 | 42.06 | | |
| 14.25 | 30.69 | | |
| 16.00 | 8.69 | | |
| 18.00 | 5.11 | | |

TABLE II

UREASE INHIBITION TESTS WITH TPTA AND PPDA IN FLUID FERTILIZERS
(UAN 31-0-0 AND UAN 36-0-0)

| SAMPLE NO. | FERTILIZER | INHIB- ITOR | WEIGHT FERTI- LIZER (g) | WEIGHT INHIB- ITOR (g) | UREA ADDED (MG) | % UREA UNHYDROLYZED 3 DAYS | % UREA UNHYDROLYZED 6 DAYS | AVERAGE % UREA UNHYDROLYZED 3 DAYS | SD* | 6 DAYS | SD* |
|---|---|---|---|---|---|---|---|---|---|---|---|
| 1A | UAN (36-0-0) | NONE | 0.6492 | 0 | 381.4 | 28.11 | | 30.53 | 3.43 | | |
| 1B | UAN (36-0-0) | NONE | 0.6533 | 0 | 383.8 | 32.96 | | | | | |
| 2A | UAN (36-0-0) | TPTA | 0.6611 | 0.0417 | 388.4 | 84.24 | | 87.63 | 4.80 | | |
| 2B | UAN (36-0-0) | TPTA | 0.6555 | 0.0415 | 385.1 | 91.03 | | | | | |
| 3A | UAN (36-0-0) | PPDA | 0.6527 | 0.0409 | 383.5 | 86.22 | | 85.73 | 3.52 | | |
| 3B | UAN (36-0-0) | PPDA | 0.6608 | 0.0415 | 388.2 | 81.24 | | | | | |
| 4A | UAN (36-0-0) | NONE | 0.6514 | 0 | 382.7 | | 0.67 | | | 0.59 | 0.12 |
| 4B | UAN (36-0-0) | NONE | 0.656 | 0 | 385.4 | | 0.50 | | | | |
| 5A | UAN (36-0-0) | TPTA | 0.6654 | 0.042 | 390.9 | | 44.37 | | | 47.82 | 4.88 |
| 5B | UAN (36-0-0) | TPTA | 0.6626 | 0.0411 | 389.3 | | 51.28 | | | | |
| 6A | UAN (36-0-0) | PPDA | 0.6636 | 0.0414 | 389.9 | | 12.10 | | | 11.32 | 1.11 |
| 6B | UAN (36-0-0) | PPDA | 0.6652 | 0.0405 | 390.8 | | 10.53 | | | | |
| 7A | UAN (31-0-0) | NONE | 0.9967 | 0 | 371.9 | 40.36 | | 39.15 | 1.71 | | |
| 7B | UAN (31-0-0) | NONE | 0.9951 | 0 | 371.3 | 37.94 | | | | | |
| 8A | UAN (31-0-0) | TPTA | 1.0055 | 0.0423 | 375.2 | 101.90 | | 97.90 | 5.66 | | |
| 8B | UAN (31-0-0) | TPTA | 0.9952 | 0.0435 | 371.3 | 93.89 | | | | | |
| 9A | UAN (31-0-0) | PPDA | 1.0073 | 0.0424 | 375.8 | 83.64 | | 83.36 | 0.38 | | |
| 9B | UAN (31-0-0) | PPDA | 0.9973 | 0.0412 | 372.1 | 83.09 | | | | | |
| 10A | UAN (31-0-0) | NONE | 0.9964 | 0 | 371.8 | | 0.81 | | | 0.69 | 0.16 |
| 10B | UAN (31-0-0) | NONE | 0.9951 | 0 | 371.3 | | 0.58 | | | | |
| 11A | UAN (31-0-0) | TPTA | 0.9965 | 0.0412 | 371.8 | | 47.75 | | | 48.48 | 1.03 |
| 11B | UAN (31-0-0) | TPTA | 0.9926 | 0.0409 | 370.3 | | 49.21 | | | | |
| 12A | UAN (31-0-0) | PPDA | 1.0035 | 0.0418 | 374.4 | | 14.03 | | | 12.61 | 2.00 |
| 12B | UAN (31-0-0) | PPDA | 0.9956 | 0.0411 | 371.5 | | 11.20 | | | | |

*SD = Standard Deviation

EXAMPLE II

The results of the tests comprising this example are herein set forth to illustrate the problems associated with use of solid urea-TPTA mixtures.

Solid samples (0.25 g) of urea-TPTA mixtures (90 weight percent urea-10 weight precent TPTA) were weighed into a 10-mL beaker, carefully spread into an even layer in the bottom of the beaker, and heated in a forced draft oven at temperatures of 42°, 50°, and 60° C. Samples were contained in desiccators inside the oven, each desiccator conataining a sodium hydroxide solution to yield a partial pressure of water of 12.73 mm Hg at the temperature employed. After heating, the samples were analyzed by High Performance Liquid Chromatography (HPLC) to determine the percent of the original TPTA remaining. The results of these kinetic studies are given in Table III, infra.

Figure 2:
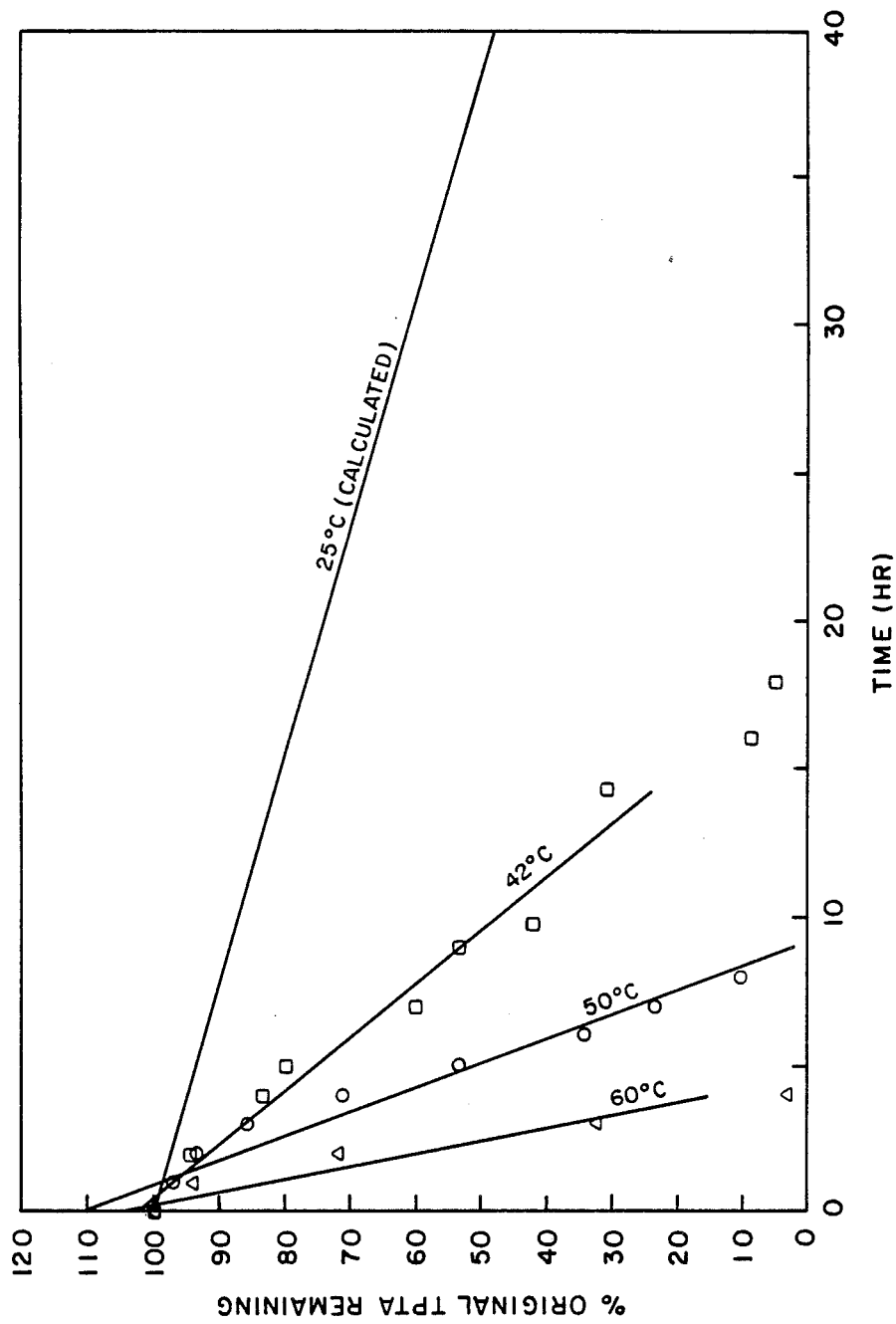
FIG. 2 is a graphical representation showing the stability of TPTA in solid mixtures with urea at 42°, 50°, and 60° C. The calculated stability line for 25° C. is also given. See Example II, infra.
Figure 3:
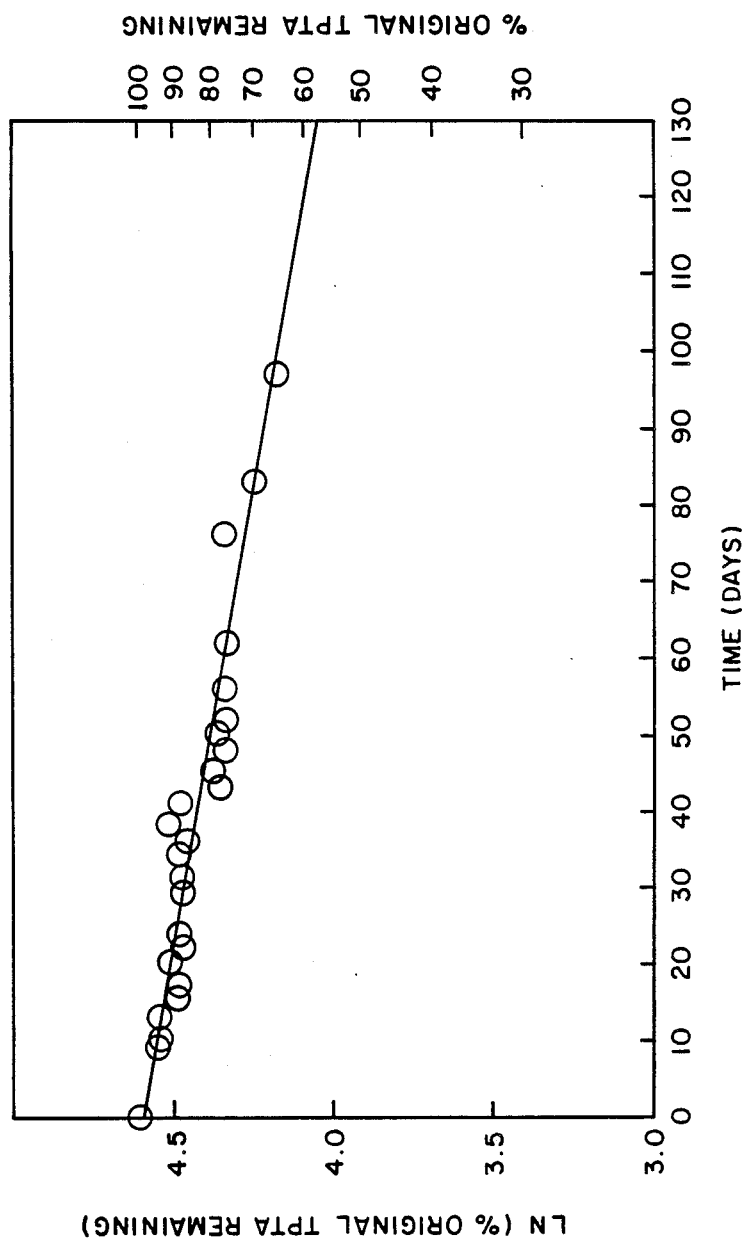
FIG. 3 is a graphical representation of the stability of TPTA in 40 weight percent urea solution at 25° C. See Example III, infra.

These results, along with the zero-order decomposition rate equations (solid lines in FIG. 2, infra) which were determined by linear regression of the decomposition data are as noted supra, shown in FIG. 2. The calculated decomposition rate for 25° C., which was determined from an Arrhenius plot of the 42°, 50°, and 60° C. data are also illustrated in FIG. 2, supra. From a perusal of FIG. 2 it is clearly evident that the shelf life of urea-TPTA mixtures is of extremely short duration. Even at 25° C. the half-life of TPTA in solid urea mixtures is only 38 hours.

EXAMPLE III

The results of the tests comprising this example are given to demonstrate an increased stability of TPTA in 40 weight percent urea solution.

A 40 weight percent urea solution (initial pH=8.5) was prepared by dissolving 80 g of urea in 120 g of water. A sample containing 1 weight percent TPTA was prepared by dissolving 1 g of TPTA in 99 g of the 40 weight percent urea solution. The sample was maintained at room temperature (25° C.) and analyzed periodically for TPTA by HPLC. The results of this kinetic study are given in Table IV infra and as noted supra plotted in FIG. 3 along with the first-order rate equation (solid line FIG. 3) which was determined by linear regression. Comparison of FIG. 2 with FIG. 3 clearly shows the greatly increased stability of TPTA in the 40 weight percent urea solution over that in solid mixtures with urea. The reaction half-life in the urea solution being 168 days compared to only 38 hours in the solid urea mixture.

TABLE IV

Stability of TPTA in 40 Wt % Urea Solution

| Time (days) | % Original TPTA remaining | pH |
|---|---|---|
| 0.00 | 100.00 | 8.5 |
| 9.04 | 94.96 | |
| 9.25 | 94.83 | |
| 10.21 | 93.97 | |
| 13.05 | 94.25 | |
| 14.99 | 89.47 | |
| 17.22 | 88.78 | |
| 20.27 | 91.44 | |
| 21.10 | | |
| 22.12 | 87.44 | |
| 24.07 | 88.80 | |
| 29.19 | 87.81 | |
| 31.23 | 87.90 | |
| 34.23 | 88.52 | 8.54 |
| 36.03 | 86.26 | |
| 38.19 | 91.36 | |
| 41.19 | 88.11 | |
| 43.10 | 78.25 | |
| 45.07 | 79.73 | |
| 48.04 | 76.59 | |
| 50.20 | 78.68 | |
| 52.00 | 76.66 | |
| 52.00 | 76.56 | 8.67 |
| 56.04 | 76.52 | |
| 62.02 | 76.02 | 8.50 |
| 76.14 | 76.78 | 8.32 |
| 83.11 | 70.05 | 8.32 |
| 97.06 | 65.19 | 8.20 |

EXAMPLE IV

The results of the tests comprising this example are herein set forth to demonstrate the increased stability of TPTA in a commercial fluid fertilizer, urea-ammonium nitrate suspension (31-0-0).

A sample containing 1 weight percent TPTA was prepared by dissolving 1 g of TPTA in 99 g of 31-0-0 having the composition given in Table I, supra, and an initial pH of 8.1. The sample was maintained at room temperature (25° C.) and analyzed periodically for TPTA by HPLC. The results of the kinetic study are given in Table V infra and as noted supra plotted in FIG. 4 along with the first-order rate equation (solid line in FIG. 4) which was determined by linear regression. Comparison of FIG. 2 with FIG. 4 clearly shows the greatly increased stability of TPTA in the 31-0-0 solution over that in solid mixtures with urea. The reaction half-life in the 31-0-0 solution being 93 days compared to only 38 hours in the solid urea mixture.

TABLE V

Stability of TPTA in UAN (31-0-0) and UAN (36-0-0) at 25° C.

| Time (days) | UAN (31-0-0) % original TPTA remaining | pH | UAN (36-0-0) % original TPTA remaining | pH |
|---|---|---|---|---|
| 0.00 | 100.00 | 8.10 | 100.00 | 7.36 |
| 1.22 | 100.00 | | 100.00 | |
| 5.22 | 97.60 | | 93.60 | |
| 7.13 | 100.00 | | 97.15 | |
| 9.09 | 99.55 | | 81.12 | |
| 12.07 | 101.78 | | 82.21 | |
| 14.22 | 100.47 | | 84.30 | |
| 16.01 | 95.59 | | 79.90 | |
| 16.01 | 95.43 | 8.06 | 73.86 | 7.43 |
| 20.05 | 89.05 | | 70.87 | |
| 26.05 | 95.55 | 8.10 | 72.43 | 7.63 |
| 40.17 | 79.49 | 8.03 | 43.14 | 7.67 |
| 47.14 | 79.62 | 8.02 | 42.94 | 7.66 |
| 61.08 | 74.35 | 7.97 | 32.25 | 7.65 |
| 64.99 | 63.03 | 8.04 | 41.41 | 7.79 |
| 71.70 | 68.55 | 8.16 | 31.14 | 7.85 |
| 82.71 | 43.85 | 8.06 | 29.60 | 7.65 |
| 90.71 | 52.17 | 7.98 | 20.67 | 7.74 |
| 96.75 | 51.55 | 7.96 | 25.07 | 7.76 |
| 103.71 | 52.04 | 8.20 | 21.73 | 7.92 |
| 111.71 | 47.46 | 8.00 | 13.09 | 7.91 |

EXAMPLE V

The results of the tests comprising this example are herein included to demonstrate the increased stability of TPTA in a commercial fluid fertilizer, urea-ammonium nitrate suspension (36-0-0).

A sample containing 1 weight percent TPTA was prepared by dissolving 1 g of TPTA in 99 g of 36-0-0 having the composition given in Table I, supra, and an initial pH of 7.4. The sample was maintained at room temperature (25° C.) and analyzed periodically for TPTA by HPLC.

Figure 4:
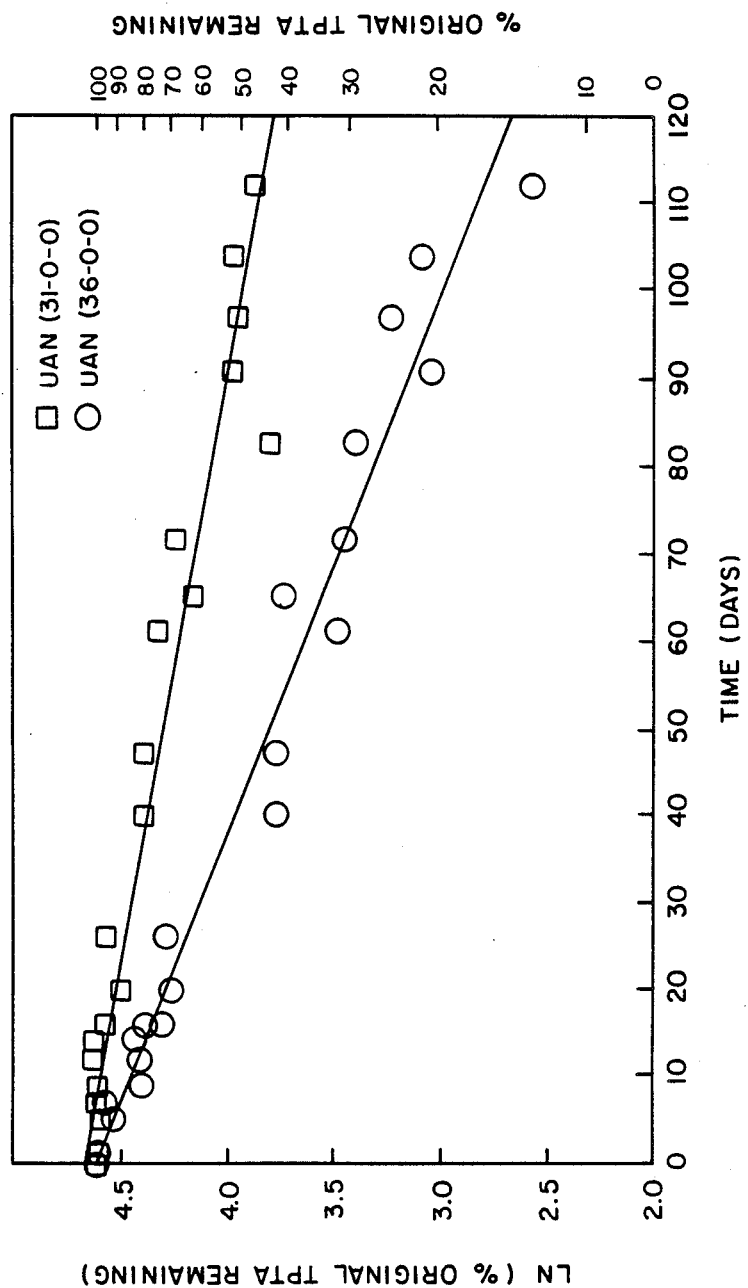
FIG. 4 is a graphical representation of the stability of TPTA in fluid fertilizers UAN (31-0-0) and UAN (36-0-0) at 25° C. See Examples IV and V, infra.

The results of this kinetic study are given in Table V supra, and as noted supra, plotted in FIG. 4 along with the first-order rate equation (solid line in FIG. 4) which was determined by linear regression. Comparison of FIG. 2 to FIG. 4 clearly shows the greatly increased stability of TPTA in the 36-0-0 solution over that in solid mixtures with urea, the reaction half-life in the 36-0-0 solution being 43 days compared to only 38 hours in the solid urea mixture.

INVENTION PARAMETERS

After sifting and winnowing through the data supra, as well as other results and operation of my new, novel, and improved method for the efficient and effective utilization of thiophosphoryl triamide incorporated into slightly acidic, neutral, or slightly basic fluid fertilizer solutions/suspensions containing urea, wherein the heretofore substantial loss of ammoniacal nitrogen from soils to which such fluid fertilizers without said thiophosphoryl triamide were oftentimes surface applied, I now present the principal operating parameters and variables for the method of the present invention as shown infra, it being understood that other variables, as considered and discussed supra may alone, or in various combinations be additional viable operational considerations and parameters.

OPERATING CONDITIONS

| Variables | Limits | Preferred | Most Preferred |
|---|---|---|---|
| TPTA Concentration (wt % of urea in fertilizer) | 0.01–10 | 0.5–5 | 0.5–5 |
| pH | 5.5–10 | 6.5–9 | 7.4–8.5 |

-continued

| | OPERATING CONDITIONS | | |
|---|---|---|---|
| Variables | Limits | Preferred | Most Preferred |
| | 50–98% original TPTA after 1 wk | 75–98% original TPTA remaining after 1 week | 90–98% original TPTA remaining after 1 week |
| Nitrogen Content (wt % N) | 5–40 | 28–40 | 28–40 |
| Phosphorous Content (wt % $P_2O_5$) | 0–25 | 0–20 | 0 |
| Potassium Content (wt % $K_2O$) | 0–30 | 0–20 | 0 |
| Micronutrient Content (wt %) | 0–5 | 0–5 | 0 |
| Temperature of Incorporation | 0–50° C. | 20–30° C. | 20–25° C. |
| Agitation Time (min.) | 0–60 | 0–10 | 0–5 |

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. A method for controlling enzymatic decomposition of urea juxtaposed soil systems, said enzymatic decomposition of said urea being to ammonia and carbonic acid and being due to the action of the enzyme urease thereupon, said method comprising the steps of:
   (a) combining and dissolving or suspending predetermined quantities of the urease inhibitor thiophosphoryl triamide in slightly acidic, neutral, or slightly basic fluid fertilizer compositions containing urea, said fluid fertilizers comprising solutions and suspensions selected from the group consisting of urea containing nitrogen base fluids of grades ranging from about 18-0-0 to about 40-0-0; and
   (b) subsequently applying the resulting thiophosphoryl triamide containing fluid fertilizer compositions to the intended soil environment;
said method characterized by the fact that the stability of thiophosphoryl triamide in said slightly acidic, neutral, or slightly basic fluid fertilizer compositions is substantially increased over that in solid mixtures with urea and further that, in vitro, from about 50 to about 98 percent of said thiophosphoryl triamide originally incorporated into said fluid fertilizer compositions is present therein after a period of about one week, and in a form available for preventing or at least substantially reducing the loss of ammoniacal nitrogen from the urea values added to the soils to which such fluid fertilizers are applied.

2. The method of claim 1 wherein said resulting thiophosphoryl triamide containing fluid fertilizer compositions are surface applied to said intended soil environment.

3. The method of claim 1 wherein said fluid fertilizer compositions contain from about 0.01 to about 10 weight percent (urea basis) thiophosphoryl triamide.

4. The method of claim 1 wherein the pH of said fluid fertilizer compositions is maintained within the range of about 5.5 to about 10.

5. The method of claim 4 wherein the pH of said fluid fertilizer compositions is maintained within the range of about 6.5 to about 9; said method further characterized by the fact that said fluid fertilizer compositions contain from about 75 to about 98 percent of the thiophosphoryl triamide originally incorporated therein after a period of about one week.

6. The method of claim 5 wherein the pH of said fluid fertilizer compositions is maintained within the range of about 7.4 to about 8.5; said method further characterized by the fact that said fluid fertilizer compositions contain from about 90 to about 98 percent of the thiophosphoryl triamide originally incorporated therein after a period of about one week.

* * * * *